US010526906B2

United States Patent
Nguyen et al.

(10) Patent No.: US 10,526,906 B2
(45) Date of Patent: Jan. 7, 2020

(54) MOBILE TURBINE BLADE WITH AN IMPROVED DESIGN FOR AN AIRCRAFT TURBOMACHINE

(71) Applicant: SNECMA, Paris (FR)

(72) Inventors: David Thien-Roger Nguyen, Torcy (FR); Franck Boisnault, Ris Orangis (FR); Maurice Guy Judet, Dammarie les Lys (FR); Laetitia Person, Epinay sur Seine (FR)

(73) Assignee: SNECMA, Paris (FR)

( * ) Notice: Subject to any disclaimer, the term of this patent is extended or adjusted under 35 U.S.C. 154(b) by 472 days.

(21) Appl. No.: 15/081,079

(22) Filed: Mar. 25, 2016

(65) Prior Publication Data

US 2016/0281525 A1    Sep. 29, 2016

(30) Foreign Application Priority Data

Mar. 27, 2015    (FR) ...................................... 15 52620

(51) Int. Cl.
| | |
|---|---|
| *F01D 11/02* | (2006.01) |
| *F01D 5/18* | (2006.01) |
| *F01D 11/04* | (2006.01) |

(52) U.S. Cl.
CPC .............. *F01D 11/02* (2013.01); *F01D 5/187* (2013.01); *F01D 11/04* (2013.01); *F05D 2220/32* (2013.01); *F05D 2240/80* (2013.01); *Y02T 50/671* (2013.01); *Y02T 50/676* (2013.01)

(58) Field of Classification Search
CPC .......... F01D 11/02; F01D 11/04; F01D 5/081; F01D 5/187; F01D 5/18–5/189
See application file for complete search history.

(56) References Cited

U.S. PATENT DOCUMENTS

| | | | |
|---|---|---|---|
| 6,402,471 B1 * | 6/2002 | Demers ................... | F01D 5/081 415/115 |
| 7,244,101 B2 * | 7/2007 | Lee ......................... | F01D 5/082 416/248 |
| 7,458,779 B2 | 12/2008 | Bil et al. | |

(Continued)

FOREIGN PATENT DOCUMENTS

| | | |
|---|---|---|
| EP | 1 205 634 A2 | 5/2002 |
| EP | 1 630 351 A1 | 3/2006 |

(Continued)

OTHER PUBLICATIONS

French Preliminary Search Report dated Jan. 18, 2016 in French Application 15 52620, filed Mar. 27, 2015 (with English Translation of Categories of Cited Documents).

*Primary Examiner* — Jason D Shanske
*Assistant Examiner* — Julian B Getachew
(74) *Attorney, Agent, or Firm* — Oblon, McClelland, Maier & Neustadt, L.L.P.

(57) ABSTRACT

A turbine blade for an aircraft turbomachine including a root, an airfoil and a platform inserted between the airfoil and the root and delimiting a gas circulation flowpath, the platform having two axial ends each forming an angel wing of which at least one has an internal cavity that will be supplied with air from the root of the blade. At least one of the two angel wings is drilled with at least one bleed hole for passage of a bleed flow from the internal cavity that will limit/prevent gas recirculation outside the flowpath.

9 Claims, 8 Drawing Sheets

(56) References Cited

U.S. PATENT DOCUMENTS

| | | |
|---|---|---|
| 8,025,483 B2 | 9/2011 | Blanchard et al. |
| 8,057,178 B2 * | 11/2011 | Itzel .................... F01D 5/186 |
| | | 416/96 R |
| 8,070,445 B2 | 12/2011 | Blanchard et al. |
| 8,251,665 B2 | 8/2012 | Baldauf et al. |
| 8,402,770 B2 | 3/2013 | Garin et al. |
| 8,864,458 B2 | 10/2014 | Blanchard et al. |

FOREIGN PATENT DOCUMENTS

| | | |
|---|---|---|
| EP | 1 706 592 B1 | 3/2011 |
| EP | 2 423 435 A1 | 2/2012 |
| EP | 2 551 458 A2 | 1/2013 |

\* cited by examiner

MOBILE TURBINE BLADE WITH AN IMPROVED DESIGN FOR AN AIRCRAFT TURBOMACHINE

TECHNICAL DOMAIN

The invention relates to the domain of turbine blades for an aircraft turbomachine. It is applicable to all types of turbomachines, for example such as a turbojet or a turboprop.

STATE OF PRIOR ART

Many developments have been made on turbine blades to continuously improve their aerodynamic performances, their mass, their ability to be suitably cooled, their ease of manufacturing, etc.

For example, such blades are described in documents EP 1 630 351 and EP 1 706 592. They are built into rotating turbine wheels by being mounted on an appropriately designed disk to house and retain the root of these blades. Conventionally, rotating wheels in a turbine are arranged axially alternating with nozzle guide vanes. The blades and nozzle segments are fitted with airfoils and platforms, the platforms delimiting a hot gases flowpath through the turbine. Platforms are in the form of angel wings at their ends facing each other in pairs, at each junction between a rotating wheel blade and a nozzle segment. Normally, the rotating wheels and the nozzle guide vanes are fitted with labyrinth seals configured to allow a calibrated bleed flow to pass, flowing radially outwards, so as to limit/prevent gas recirculation outside the gas flowpath by these gases passing between the two angel wings. After passing through the labyrinth, the bleed flow can thus rejoin the flowpath passing through the gap between the two facing angel wings. This flow generates a back pressure limiting/preventing the recirculation of hot gases outside the flowpath.

Although satisfactory products have been made as a result of many developments made on turbine blades, there is nevertheless a need to further optimise the design of these blades.

SUMMARY OF THE INVENTION

The purpose of this invention to partly satisfy this need is a turbine blade of an aircraft turbomachine.

The invention is advantageous not only because it is lightweight due to the presence of a large cavity at at least one of the two angel wings, but also because this cavity is judiciously used to add functionality to the blade. A bleed flow is extracted from this cavity to satisfy the hot gas recirculation problem outside the flowpath. This method of managing the recirculation problem, also referred to as "vortex", eliminates the need for labyrinth seals used in solutions according to prior art. Elimination of the labyrinth seals facilitates the design of rotating wheels and reduces the global mass. Furthermore, the bleed efficiency can be improved by treating the hot gas recirculation problem as close to the critical location consisting of the gap between facing angel wings as possible, and therefore the global performances of the turbine can be increased. The efficiency of the bleed flow is also explained by the ease of design of each bleed hole, for which the position, diameter and orientation can be adjusted to optimise adaptation to influential geometric singularities. This increased efficiency advantageously induces a gain in the drawn off air flow. Gas mix losses in the flowpath can also be limited due to the flexibility in the design of bleed holes, thus increasing the turbine efficiency.

It should also be noted that the mass saving made possible by the presence of each angel wing cavity can reduce the mechanical load at the blade root and the part of the disk retaining the root, this load resulting from the centrifugal force associated with the rotating blades. Due to this reduction in load, the disk design can also be optimised and its mass can be reduced. As an example for guidance, it has been observed that a mass saving of about 9% on each blade can advantageously reduce the mass of the disk by 7%, for operation under similar or higher rotation speeds.

The invention preferably comprises at least any one of the following optional characteristics taken in combination or in isolation.

Said angel wing cavity extends over a circumferential length equal to at least 75% of the circumferential length of the angel wing, which can give a large mass saving.

The blade comprises a shank radially connecting the root of the blade and the platform, the two angel wings each projecting circumferentially on each side of the shank. The cavity in at least one of the two angel wings also extends into part of said shank, in order to further improve the mass saving.

Each angel wing comprises a radially outer surface, a radially inner surface and a junction edge between the radially inner surface and the radially outer surface, and said at least one bleed hole passes through said junction edge.

Each bleed hole is oriented approximately along the axial direction or is inclined radially outwards from the axial direction, by an angle Aa between −10° and 10°.

The invention also relates to an assembly comprising a turbine blade as defined above, and a nozzle segment arranged axially facing said blade, said nozzle segment comprising an airfoil and a platform also delimiting the gas circulation flowpath, the nozzle segment platform comprising an axial end in the form of an angel wing axially facing one of the two angel wings of the turbine blade provided with at least one bleed hole. Furthermore, said at least one bleed hole carries a bleed flow originating from the cavity and that will limit/prevent recirculation of gas outside said flowpath by passing between the two facing angel wings.

Another purpose of the invention is a turbine wheel for an aircraft turbomachine comprising a disk and a plurality of blades like that described above, each turbine blade being mounted on the disk.

Another purpose of the invention is an aircraft turbomachine comprising at least one turbine blade as described above, or an assembly as described above, or a turbine wheel as described above.

Finally, another purpose of the invention is a method of manufacturing a turbine blade as described above, each angel wing cavity being achieved by eliminating a wax block after casting the blade in a mould, and each bleed hole is then made by machining the angel wing. Techniques other than machining can be used without going outside the scope of the invention.

Other advantages and characteristics of the invention will become clear from the non-limitative detailed description below.

BRIEF DESCRIPTION OF THE DRAWINGS

This description will be made with reference to the appended drawings among which.

DETAILED PRESENTATION OF PARTICULAR EMBODIMENTS

Figure 1:
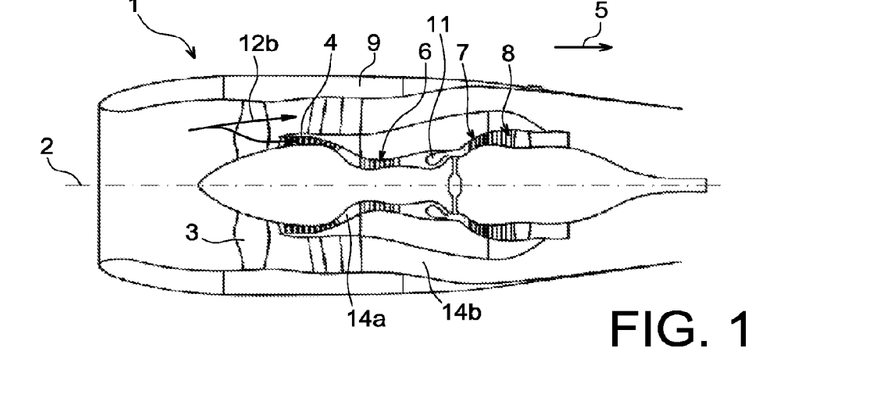
FIG. 1 is a diagrammatic axial sectional view of a twin shaft turbofan engine according to the invention.

Firstly with reference to FIG. 1, this figure shows an aircraft turbomachine 1, according to one preferred embodiment of the invention. This is a twin shaft turbofan engine. Nevertheless, it could be another type of turbomachine, for example a turboprop, without going outside the scope of the invention.

The turbomachine 1 has a longitudinal axis 2 about which its different components extend. It comprises a fan 3, a low pressure compressor 4, a high pressure compressor 6, a combustion chamber 11, a high pressure turbine 7 and a low pressure turbine 8, in order from the upstream to the downstream end along a main gas flow direction 5 through this turbomachine.

Conventionally, after passing through the fan, air is divided into a central core engine flow 12a and a fan flow 12b that surrounds the core engine flow. The core engine flow 12a flows in a main gas flowpath 14a through compressors 4, 6, the combustion chamber 11 and the turbines 7, 8. The fan flow 12b flows through a fan flowpath 14b radially delimited on the outside by an engine case, surrounded by a nacelle 9.

Figure 2:
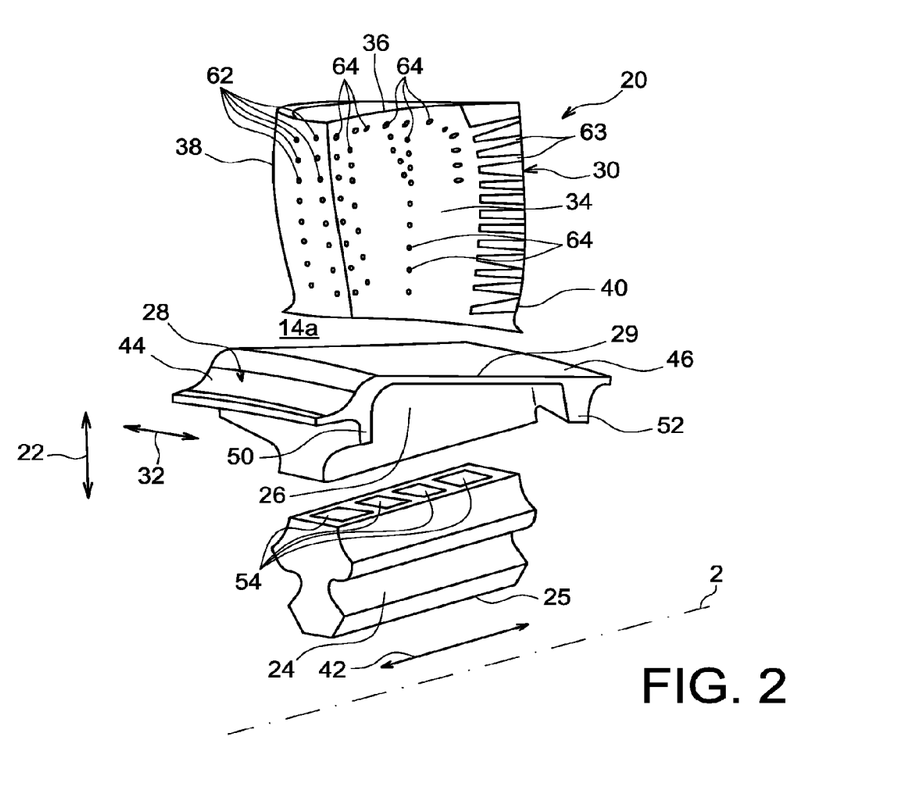
FIG. 2 is an exploded perspective view of a turbine blade in the turbofan engine shown in FIG. 1.

FIG. 2 shows an exploded view of a blade 20 that will be used on any one of the turbines 7 and 8, particularly on the high pressure turbine 7. Conventionally, the blade 20 comprises a blade root 24, a shank 26, a platform 28 and an airfoil 30 forming the aerodynamic part of the blade, along the radial direction 22 from the inside towards the outside. The blade root 24 has a so-called "fir-tree" external shape, so that it can be inserted into a corresponding groove in a turbine disk that will support the blades. The shank 26 is usually thin in a circumferential direction 32, while the platform 28 extends also on each side of the shank 26 along this circumferential direction 32. More precisely, the platform 28 extends along the circumferential direction beyond the intrados 34 and the extrados 36 of the blade 30, and also extends along an axial direction 42 beyond a leading edge 38 and a trailing edge 40 of the airfoil.

With its external surface 29, the platform 28 radially delimits the inside of the main flowpath 14a. The platform 28 has two opposite axial ends, each forming an angel wing. There is an upstream angel wing 44 located on the upstream side of the leading edge 38, and a downstream angel wing 46 located on the downstream side of the trailing edge 40 of the airfoil 30.

The blade 20 also comprises two stiffeners 50, 52 associated with the angel wings 44, 46 respectively. Each stiffener 50, 52 extends radially inwards from its associated angel wing, along a circumferential length approximately equal to the length of the angel wing, and an axial thickness that is small compared with the circumferential length. Each stiffener 50, 52 therefore also projects on each side of the shank 26 along the circumferential direction 32, at the axial ends of this shank. In other words, each stiffener 50, 52 has the global shape of an angular flange segment centred on a turbine rotation axis, corresponding to axis 2.

Preferably, the blade 20 is a single piece hollow part obtained by casting, preferably made using the lost wax casting technique as will be described below. The blade comprises internal ducts for the circulation of cooling air drawn off from one of the compressors 4, 6 of the turbojet. These ducts pass through the blade in the radial direction and have inlet openings opening in the lower face 25 of the root 24, to supply fresh air. In this respect, some of these ducts 54 are shown diagrammatically through the root 24 in FIG. 2.

In a manner known in itself, the hollow wall of the airfoil 30 comprises through holes and slits through which cooling air is evacuated. For guidance, the leading edge 38 is convex in shape and it is provided with a series of cooling holes 62 passing through the wall of the airfoil in this region. The trailing edge 40 is tapered in shape and it comprises a series of cooling slits 63. The intrados 34 that is significantly heated during operation, also comprises a series of through holes 64 distributed in several locations on this intrados.

Figure 3:
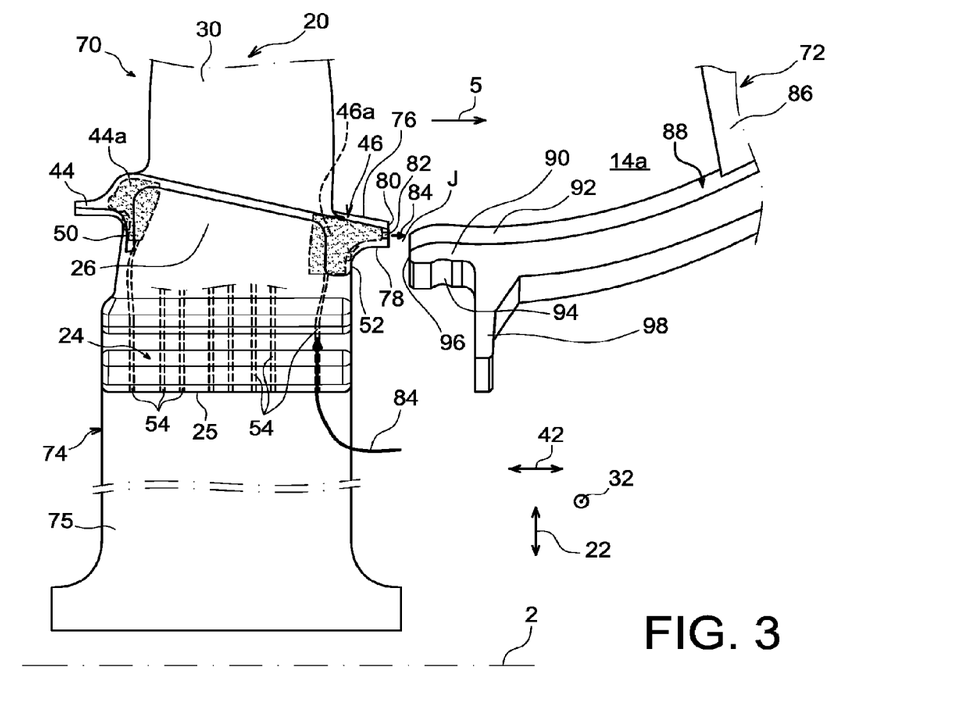
FIG. 3 shows an axial half-sectional view of an assembly according to the invention, comprising a turbine blade and a turbine nozzle guide vanes segment.

FIG. 3 shows an assembly 70 of the high pressure turbine 7, this assembly comprising the blade 20 and a turbine nozzle segment 72 located in the downstream continuity of the blade 20, facing it axially. The blade 20 forms part of the rotating turbine wheel 74 centred on the axis 2, this wheel being equipped with a turbine disk 75 that has grooves on its periphery to retain the roots 24 of blades 20, these blades being distributed around the entire periphery of the disk 75.

Figure 4:
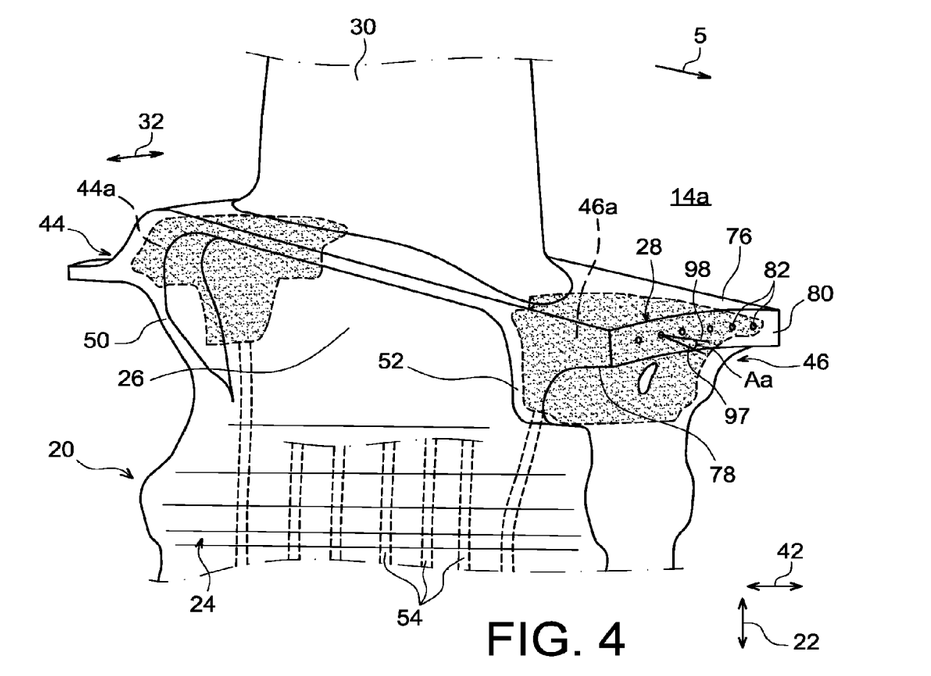
FIG. 4 is a perspective view of one of the turbine wheel blades shown more generally in the previous figure.

FIGS. 3 and 4 show one of the specific features of the invention, namely the presence of one internal cavity in the upstream angel wing 44 and in the downstream angel wing 46, these internal cavities being shown in grey in FIGS. 3 and 4. The internal cavity 44a associated with the upstream angel wing 44 is supplied by one or several air supply ducts 54 passing through the root 24 and the shank 26. As is described below, the internal cavity 44a extends not only inside the angel wing, but also in part of the shank 26 adjacent to the upstream angel wing 44, to further increase the weight saving on the blade.

Similarly, the internal cavity 46a associated with the downstream angel wing 46 is supplied by one or more supply ducts 54 passing through the root 24 and the shank 26. The internal cavity 46a extends not only inside the angel wing, but also inside part of the shank 26 adjacent to the downstream angel wing 46, and also in part of the downstream stiffener 52, to further increase the weight saving on the blade.

The downstream angel wing 46 comprises a radially outer surface 76, a radially inner surface 78, and a junction edge 80 between the two surfaces 76, 78. The edge 80 is oriented approximately in the axial direction towards the downstream direction. One or more bleed holes 82 project from this edge 80, making the internal cavity 46a communicate with the external environment of the angel wing 46. More precisely, holes 82 enable passage of a bleed flow 84 from the cavity 46a that will limit/prevent gas recirculation outside the flowpath 14a by bypassing the angel wing 46.

In this respect, it should be noted that the nozzle segment 72 conventionally comprises an airfoil 86 and a platform 88 also delimiting the flowpath 14a. The platform 88 has an upstream axial end in the form of an angel wing 90, this angel wing being located axially in line with the bleed holes 82. More precisely, the upstream angel wing 90 of the segment 72 comprises a radially outer surface 92, a radially inner surface 94, and a junction edge 96 between the two surfaces 92, 94. The edge 96 is oriented approximately in the axial direction facing upstream and facing the edge 80 of the downstream angel wing 46 of the blade. There is a gap "J" between the two edges 80, 96 into which the bleed flow 84 is injected so as to create a back pressure in the flowpath 14a that will limit/prevent recirculation of hot gases outside this main flowpath. Due to this created back pressure, the hot gases in the core engine flow cannot escape from the flowpath 14a through the gap "J" between the two angel wings 46, 90 facing each other.

In order for the bleed flow 84 to be effective and to minimise losses of the gas mix in the flowpath, its orientation and intensity can easily be optimised by adapting the design of the bleed holes 82 accordingly. For guidance, each hole 82 may be axially oriented, namely parallel or approximately parallel to the axis 2, or in an axial section, an angle Aa may be provided between the axial direction 97 and the central axis 98 of each hole 82. As shown diagrammatically in FIG. 4, the angle Aa may be between 0 and 10°, along the direction enabling radially outwards injection of the bleed flow 84. In this case, the flow 84 is then oriented in the flowpath, but alternately could be oriented in the opposite direction, in other words radially inwards in a so-called "outside the flowpath" zone. In this alternative, the angle Aa may also be between 0 and 10° from the axial direction 97.

Figure 5:
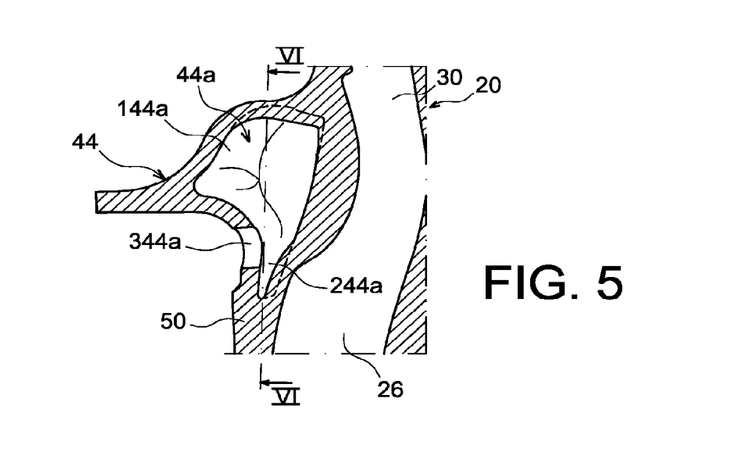
FIG. 5 is a sectional view along line V-V in FIG. 5, showing the upstream angel wing of the blade and its cavity.
Figure 6:
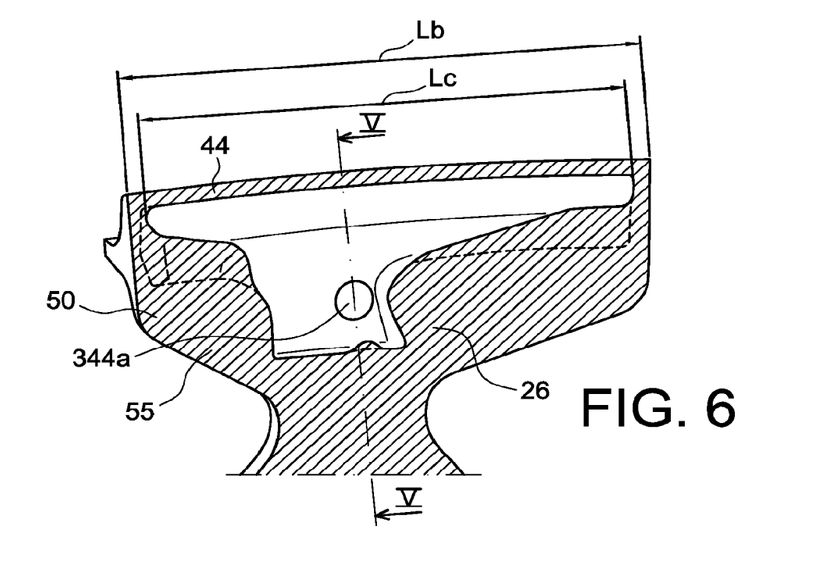
FIG. 6 is a sectional view along line VI-VI in FIG. 5.
Figure 7:
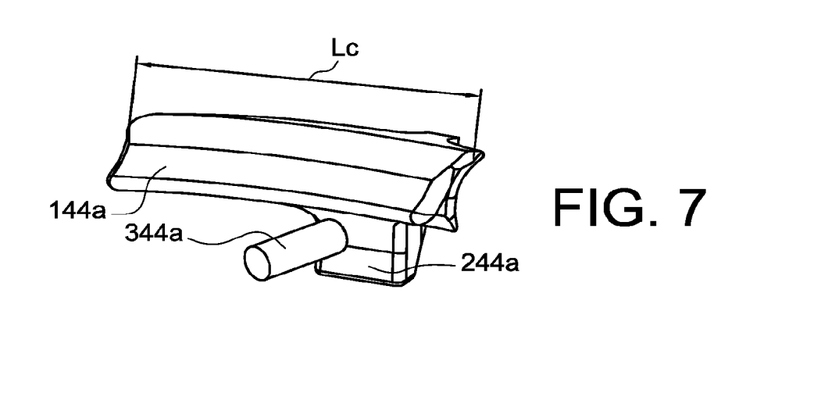
FIGS. 7 and 8 show perspective views of the shape of the cavity associated with the upstream angel wing of the blade, at two different view angles.
Figure 8:
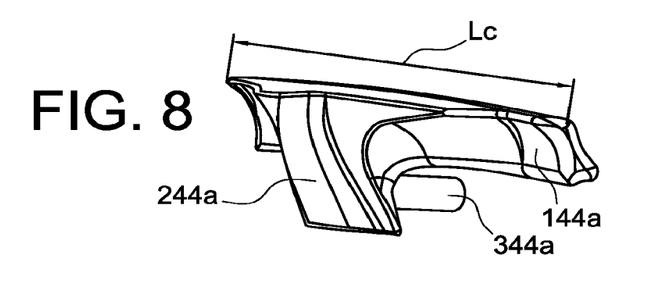

With reference now to these FIGS. 5 and 6, the figures more precisely show the internal cavity 44a associated with the upstream angel wing 44, the shape of this cavity also being shown in FIGS. 7 and 8. As mentioned above, the cavity 44a extends inwards into the angel wing 44 over a circumferential length Lc longer than the circumferential length Lb of the angel wing 44. This wide extent of the internal cavity 44a enables a corresponding material saving. Therefore the essential part of this cavity is arranged within the angel wing 44, with a first part 144a with a large volume. A second part 244a extends the cavity 44a in the downstream direction and radially inwards, in a portion of the shank 26. The second part 244a thus has a circumferential thickness much smaller than the circumferential length Lc of the first part 144a. These figures show a communication orifice 344a between the second part of the cavity 244a and the outside of the shank 26. However, according to the manufacturing method that will be described below, this orifice 344a is then closed off after the wax that formed the cavity 44a has been eliminated.

Figure 9:
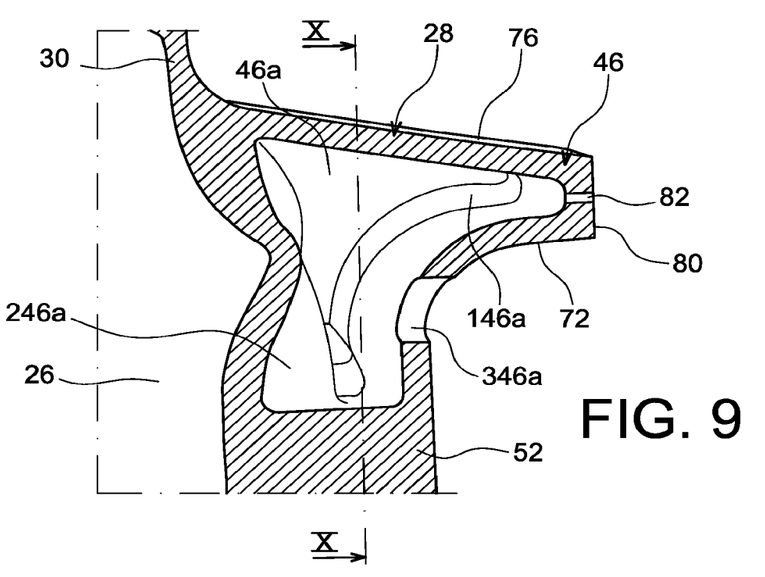
FIG. 9 is a sectional view along line IX-IX in FIG. 10, showing the downstream angel wing of the blade and its cavity.
Figure 10:
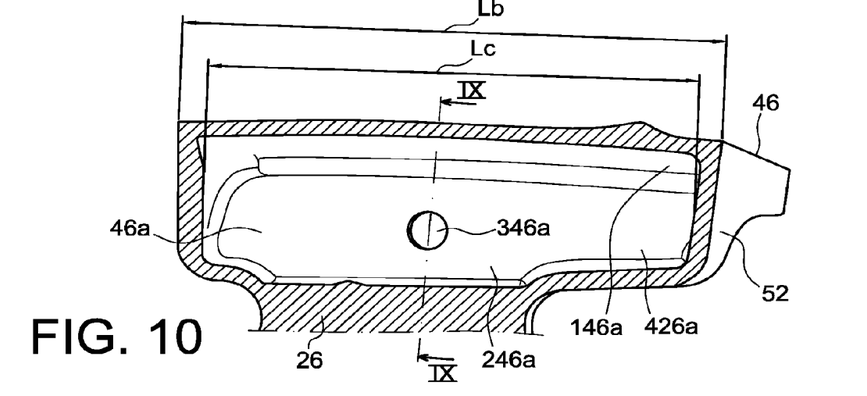
FIG. 10 is a sectional view along line X-X in FIG. 9.
Figure 11:
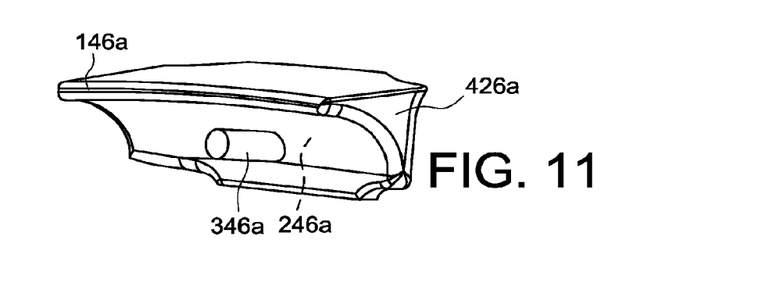
FIGS. 11 and 12 show a perspective view of the shape of the cavity associated with the downstream angel wing of the blade, at two different view angles.
Figure 12:
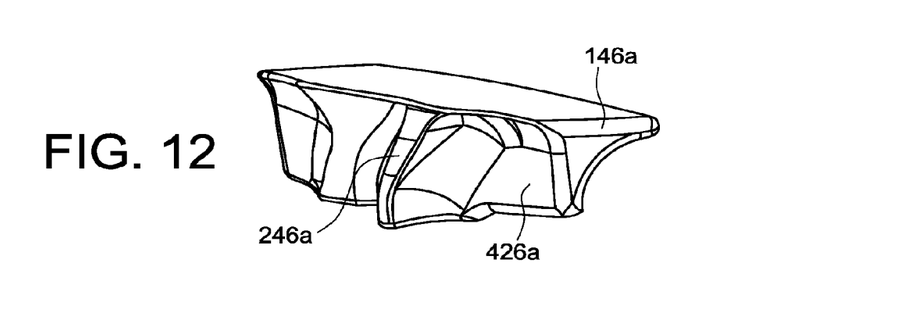

Furthermore, with reference now to FIGS. 9 and 10, the internal cavity 46a associated with the downstream angel wing 46 is shown more precisely, the shape of this cavity also being shown in FIGS. 11 and 12. As mentioned above, the cavity 46a extends into the inside of the angel wing 46 over a circumferential length Lc longer than the circumferential length Lb of the angel wing 46. This large extent of the internal cavity 46a also reduces the mass. A large portion of this cavity is located within the angel wing 46, with a first part 146a having a large volume. A second part 246a extends the cavity 46a in the upstream direction and radially inwards, in a portion of the shank 26. The circumferential thickness of the second part 246a is therefore much less than the circumferential length Lc of the first part 146a. Finally, the cavity 46a comprises a third part 426a extending inside the stiffener 52, over a circumferential length Lc approximately equal to the circumferential length of the first part 146a formed in the angel wing 46. The third part 426a thus extends the first part 146a radially inwards.

The figures show a communication orifice 346a between the second part of the cavity 246a and the outside of the shank 26. In this case also, this orifice 346a will be closed off after the wax that formed the cavity 46a has been eliminated.

Figure 13A:
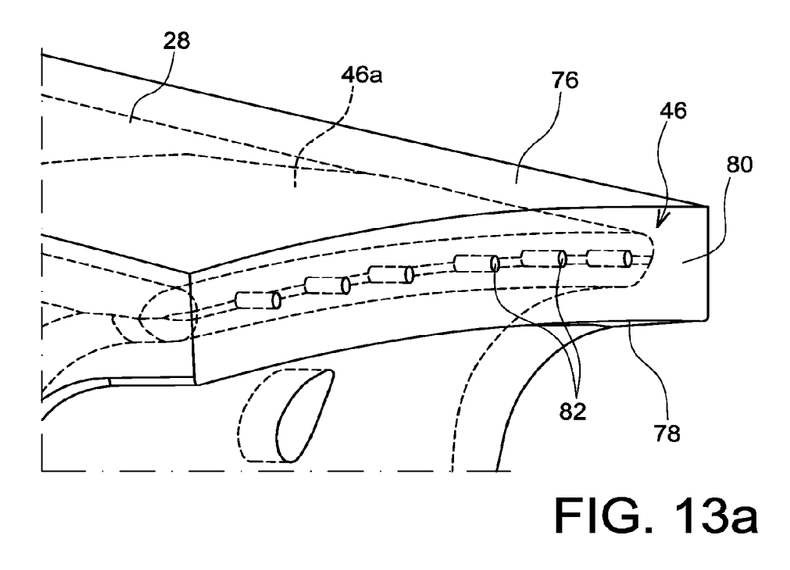
FIGS. 13a to 13c show various possible embodiments for the bleed holes associated with the downstream angel wing cavity.
Figure 13B:
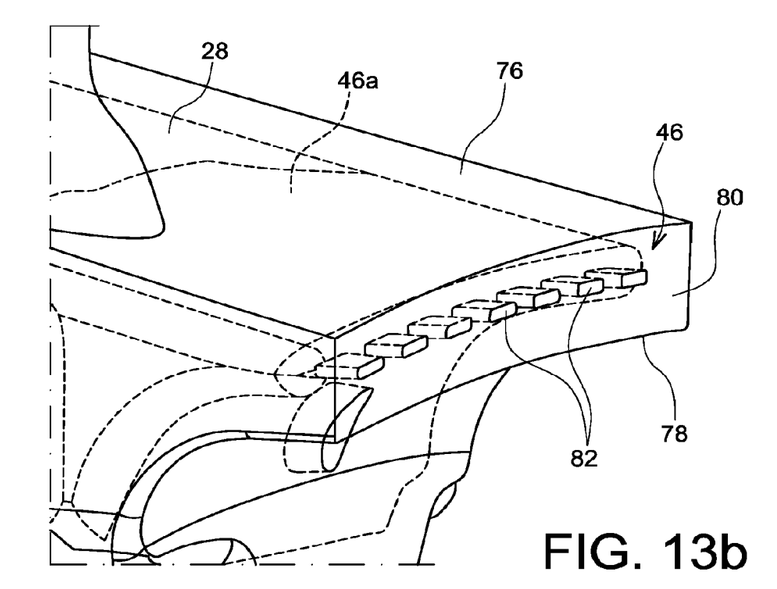
Figure 13C:
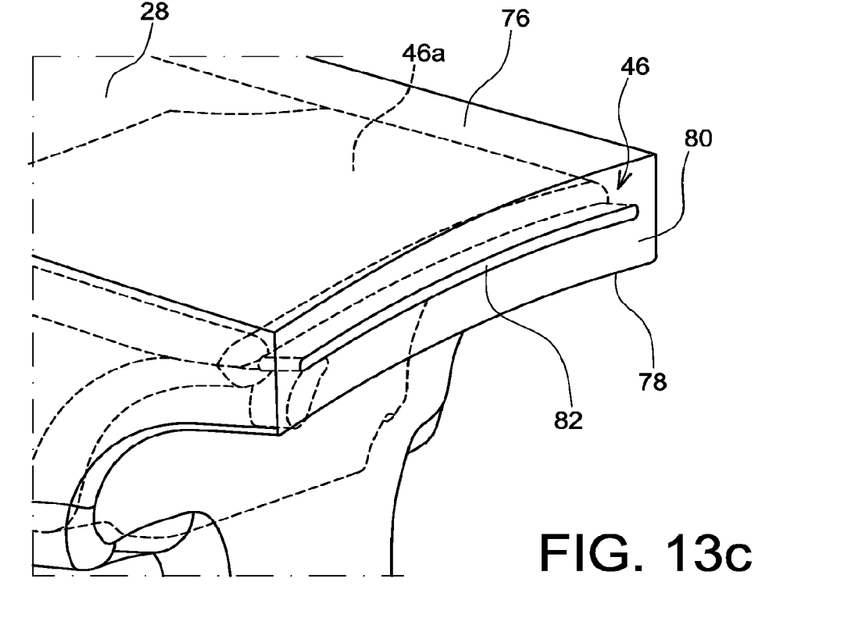

FIGS. 13a to 13c show different possible embodiments for the bleed holes 82 fitted in the downstream angel wing 46. In FIG. 13a, several approximately cylindrical holes 82 with a circular cross-section are circumferentially spaced from each other, so as to form a multiperforation with one or several rows. The shape of the cross-section of holes may be modified, for example by extending this cross-section in the circumferential direction in order to make slits 82, as shown diagrammatically in FIG. 13b. Another possibility consists of providing a single slit 82 extending over all or part of the circumferential length of the cavity, as shown diagrammatically in FIG. 13c.

Figure 14:
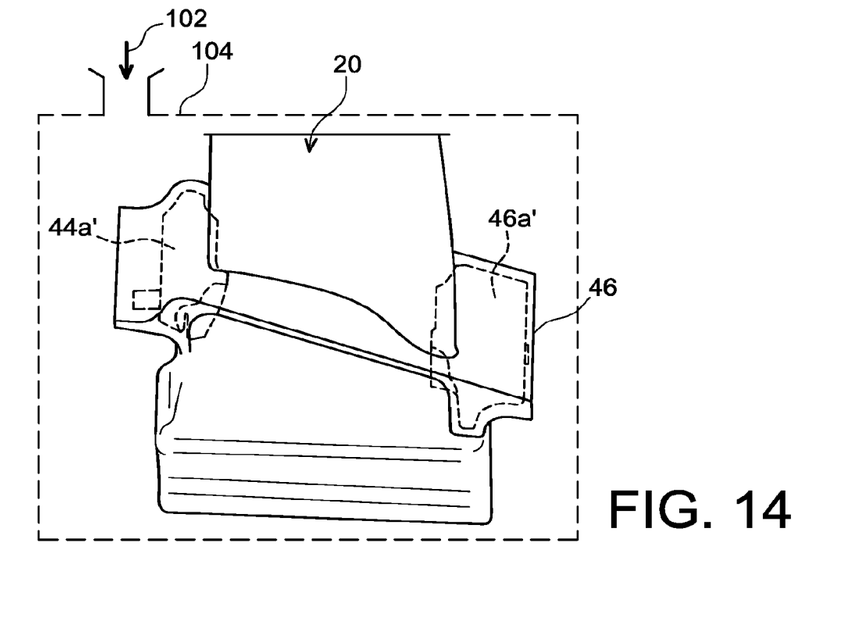
FIG. 14 is a diagrammatic view of one of the steps in manufacturing the blade shown in FIG. 4, according to a method specific to the invention.

Finally with reference to FIG. 14, this figure shows a step in a method of manufacturing the blade 20, by casting 102 metal into a mould 104. The mould is provided with wax blocks 44a', 46a' with shapes complementary to the shapes of the required internal cavities 44a, 46a. After metal has been poured into the mould 104 and around the wax blocks 44a', 46a', these wax blocks are removed by a conventional technique, for example by chemical attack. After the blocks have been removed, the orifices 344a and 346a described with reference to the previous figures are closed off at the blade shank.

The bleed holes 82 mentioned above are made by machining, for example by simply drilling the angel wing 46. However, other techniques can be used. For example, corresponding elements could be provided in the mould 104, such as ceramic rods, and then these rods could be subsequently removed after the metal has been cast, in order to create the required bleed holes.

Obviously, those skilled in the art could make various modifications to the invention as disclosed above, only as non-limitative examples.

The invention claimed is:

1. A turbine blade for an aircraft turbomachine wherein the turbine blade is mounted for rotation about a rotation axis, the turbine blade comprising a root having at least one cooling air duct extending radially relative to the rotation axis, an airfoil and a platform inserted between the airfoil and the root and delimiting a gas circulation flowpath, the platform having two axial ends each forming an angel wing of which at least one has an internal cavity that will be supplied with air from the root of the blade by the at least one radially extending cooling air duct, wherein the at least one internal cavity has a sectional area in a plane including the rotation axis direction greater than that of any one of the at least one radially extending cooling air ducts, wherein at least one of the two angel wings is drilled with at least one bleed hole for passage of a bleed flow from the internal cavity that will inhibit gas recirculation outside said flowpath by bypassing said at least one of the two angel wings, and wherein the blade comprises a stiffener extending radially inwards from each of the two angel wings, each said stiffener having a circumferential length equal to a circumferential length of the respective angel wing, and wherein said cavity of the at least one of the two angel wings extends in axial alignment with a respective one of said stiffeners and in a radial direction along part of the respective one of said stiffeners to a location radially inwards from said at least one of the two angel wings.

2. The blade according to claim 1, wherein said internal cavity of the at least one of the two angel wings extends along a circumferential length corresponding to at least 75% of a circumferential length of the at least one of the two angel wings.

3. The blade according to claim 1, further comprising a shank radially connecting the root of the blade and the platform and having sides in a circumferential direction, the two angel wings each projecting circumferentially on each side of the shank, wherein said cavity of the at least one of the two angel wings also extends into part of said shank.

4. The blade according to claim 1, wherein each angel wing comprises a radially outer surface, a radially inner surface, and a junction edge between the radially inner surface and the radially outer surface, wherein said at least one bleed hole of the at least one of said two angel wings passes through the junction edge of the respective angel wing.

5. The blade according to claim 1, wherein each bleed hole is oriented along an axial direction, or is inclined radially outwards from the axial direction, by an angle Aa between −10° and 10°.

6. An assembly comprising a turbine blade according to claim 1 and a nozzle segment arranged axially facing said blade, said nozzle segment comprising an airfoil and a platform also delimiting the gas circulation flowpath, the platform of the nozzle segment comprising an axial end in the form of an angel wing, axially facing the at least one of the two angel wings of the turbine blade provided with said at least one bleed hole, wherein said at least one bleed hole carries the bleed flow originating from the internal cavity, which bleed flow will inhibit recirculation of gas outside said flowpath by passing between the two facing angel wings.

7. A turbine wheel for an aircraft turbomachine comprising a disk and a plurality of blades according to claim 1, each turbine blade being mounted on the disk.

8. An aircraft turbomachine comprising at least one turbine blade according to claim 1.

9. A method of manufacturing the turbine blade according to claim 1, wherein each angel wing cavity is achieved by eliminating a wax block after casting the blade in a mould, and wherein each bleed hole is then made by machining the angel wing.

* * * * *

UNITED STATES PATENT AND TRADEMARK OFFICE
CERTIFICATE OF CORRECTION

PATENT NO. : 10,526,906 B2  
APPLICATION NO. : 15/081079  
DATED : January 7, 2020  
INVENTOR(S) : David Thien-Roger Nguyen et al.

Page 1 of 1

It is certified that error appears in the above-identified patent and that said Letters Patent is hereby corrected as shown below:

On the Title Page

Item (54) and in the Specification, Column 1, Lines 1-3, Title, delete "MOBILE TURBINE BLADE WITH AN IMPROVED DESIGN FOR AN AIRCRAFT TURBOMACHINE" and insert -- TURBINE BLADE WITH IMPROVED DESIGN FOR AN AIRCRAFT TURBOMACHINE --, therefor.

Signed and Sealed this  
Sixteenth Day of June, 2020

Andrei Iancu  
*Director of the United States Patent and Trademark Office*